United States Patent [19]
Mathews
[11] 3,796,837
[45] Mar. 12, 1974

[54] NETWORK TRAFFIC CONTROL SYSTEM

[75] Inventor: Harold Charles Mathews, West End, N.J.
[73] Assignee: Bell Telephone Laboratories, Incorporated, Murray Hill, Berkeley Heights, N.J.

[22] Filed: Sept. 13, 1972
[21] Appl. No.: 288,507

[52] U.S. Cl. .......................................... 179/18 EA
[51] Int. Cl. .......................................... H04m 3/42
[58] Field of Search .......................................... 179/18 EA

[56] References Cited
UNITED STATES PATENTS
3,432,621 3/1969 Bininda et al. ................. 179/18 EA
3,335,229 8/1967 Burke et al. ................. 179/18 EA
3,394,231 7/1968 Hopper et al. ................. 179/18 EA

*Primary Examiner*—William C. Cooper
*Attorney, Agent, or Firm*—D. A. Marshall

[57] ABSTRACT

A traffic control arrangement for use in a communication switching network wherein the rate of incoming calls offered a preferred trunk group is time controlled to reduce the number of calls appearing at a congested switching center. A detector ascertains subscriber calls routed from a local center office to an overloaded switching center. During the overload period the detector enables timing apparatus to control the rate at which incoming subscriber lines are connected with trunks of the preferred trunk group terminated in the congested switching center.

10 Claims, 1 Drawing Figure

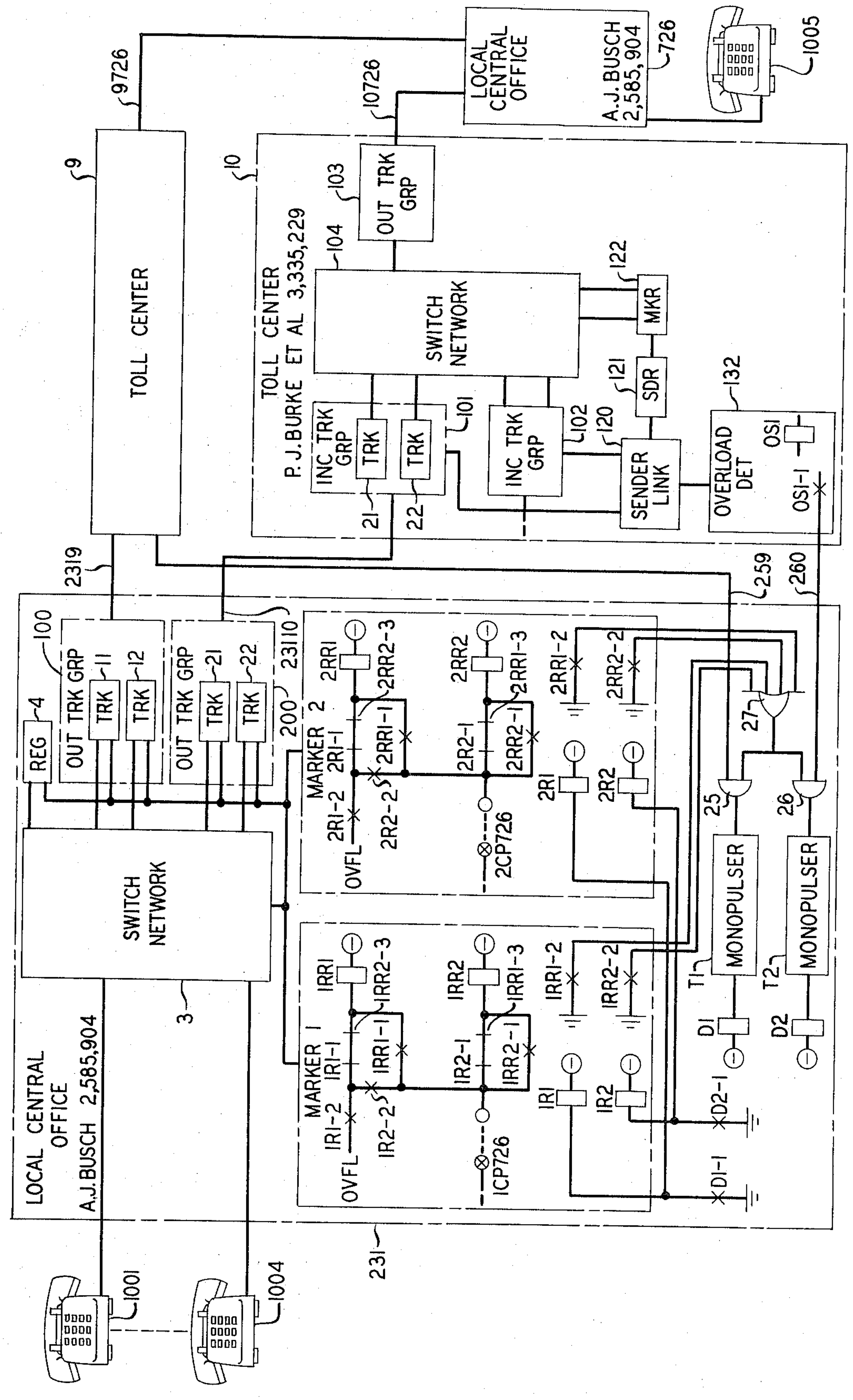
LOCAL CENTRAL OFFICE
A.J.BUSCH 2,585,904
726
1005
9726
10726
TOLL CENTER
9
10
TOLL CENTER
P.J.BURKE ET AL 3,335,229
104
OUT TRK GRP
103
SWITCH NETWORK
MKR
122
SDR
121
OVERLOAD DET
132
OS1
OS1-1
INC TRK GRP
TRK
21
22
101
102
120
SENDER LINK
2319
259
260
LOCAL CENTRAL OFFICE
A.J.BUSCH 2,585,904
REG
4
OUT TRK GRP
100
11
12
23110
200
MARKER 2
2RR1
2RR2-3
2RR2
2RR1-3
2RR1-2
2RR2-2
2R1-1
2RR1-1
2R2-1
2RR2-1
2R1-2
2R2-2
OVFL
2CP726
2R1
2R2
27
25
26
MONOPULSER
T1
T2
D1
D2
SWITCH NETWORK
3
MARKER 1
1RR1
1RR2-3
1RR2
1RR1-3
1RR1-2
1RR2-2
1R1-1
1RR1-1
1R2-1
1RR2-1
1R1-2
1R2-2
1CP726
1R1
1R2
D2-1
D1-1
231
1001
1004

NETWORK TRAFFIC CONTROL SYSTEM

BACKGROUND OF THE INVENTION

1. Field of the Invention

This invention concerns switching networks. In particular, it relates to a communications switching network wherein instrumentalities are employed to minimize the effects of traffic overloads occurring at individual switching centers serving the network.

2. Description of the Prior Art

Integrated switching networks, such as the telephone direction distance dialing switching network, are subjected to fluctuating traffic conditions that often congest the network and degrade the service normally provided subscribers utilizing the network. Typically, a large nationwide telephone network is made up of smaller switching networks or regions. Each region is served by one or more trunk interconnected switching centers arranged for establishing communications paths within the region and for establishing communications paths with other regions. These switching centers are usually classified in descending order as regional centers, sectional centers, primary centers, and toll centers. The lower order toll centers each serve a plurality of end switching offices, or local central offices, that are employed to serve the telephone subscribers of the various cities and towns in the toll center area.

Calls between two remotely located subscribers are established by serially interconnecting local central offices over appropriate trunk routes selectively established through a hierarchy of the switching centers. The switching centers are each interconnected by trunk facilities and are provided with common control switching equipment arranged to establish the aforementioned communication paths by selectively connecting incoming trunk facilities with numerous outgoing trunk facilities. In addition, the switching centers have alternate routing provisions for completing subscriber calls whereby an incoming trunk facility attempting connection with an outgoing trunk group having concurrently busy trunk facilities may be directed to connect with an idle trunk facility of another outgoing trunk group.

At switching centers having access to numerous trunk facilities many alternate route selections are available and the common control equipment may be held busy for prolonged periods of time while laboriously searching for an idle outgoing trunk facility to establish one particular communication path. During the time intervals common control equipment is searching for idle trunk facilities other subscriber calls originating on incoming trunk facilities continue to wait until they can be served. Thus, a large number of originating subscriber calls attempting to establish trunk routes through a busy switching center, such as a toll center, represent a heavy traffic condition and create a traffic overload by bidding for the services of common control equipment already busy searching for idle outgoing trunk facilities to serve prior originating subscriber calls.

If this traffic overload is allowed to prevail for any length of time without control, subscriber traffic begins backing up through other switching centers and local central offices, thereby rapidly congesting the entire network. Thus, a traffic overload at one strategically located switching center might set off a chain reaction causing traffic delays at virtually every other switching point of the network.

Various schemes have heretofore been devised to control traffic in a switching network. For example, arrangements are known whereby designated switching centers are provided with apparatus for evaluating traffic situations at the switching center. If an overload is detected at one of these monitored switching centers, other switching centers and local central offices having access to the overloaded switching center are directed to allow only a predetermined percentage of originating traffic connection with trunk groups terminated at the overloaded switching center. The remaining traffic, denied access to the overloaded switching center, is alternate routed to other switching centers of the network.

A problem arises in these arrangements, referred to as percentage cancellation arrangements, in that during the occurrence of heavy overloads of traffic subscriber calls greatly increase in number and thereby increase the percentage of traffic offered to an already overloaded switching center. This increase of offered percentage traffic continues to congest the overloaded switching center even though percentage cancellation is being continuously performed at switching centers and local central offices attempting to be served by the overloaded switching center.

Accordingly, a need exists in the art for a traffic controlling arrangement capable of dynamically limiting the rate of traffic offered an overloaded switching center to prevent congestion of a network served by the switching center.

SUMMARY OF THE INVENTION

In the exemplary embodiment of the invention, traffic management apparatus is provided for dynamically controlling the time rate of offering traffic to the switching centers of a communication switching network. The switching network, embodying the principles of the present invention, is comprised of a plurality of switching centers for establishing communication paths between network subscribers by selectively interconnecting trunk facilities coupled to other switching centers and local central offices serving subscriber line facilities.

Detector apparatus located at switching centers and local central offices detect subscriber call attempts generated by incoming line and trunk facilities concurrently with traffic overload conditions existing at a congested serving switching center. The activation of the detector apparatus enables timing circuitry to control the rate of traffic offered the congested switching center by directing the common control equipment of local central offices and other switching centers to inhibit connection of calling lines and incoming trunk facilities with outgoing trunk facilities terminated in a congested switching center for predetermined intervals of time.

In accordance with one feature of the invention, detector apparatus is arranged to detect traffic overload conditions occurring at network switching centers simultaneously with subscriber calls appearing on incoming lines and trunk facilities of local central offices and other switching centers being routed through the congested switching centers.

Another feature of the invention is the provision of timing apparatus at local central offices and switching centers coupled to serving switching centers for generating timing pulses upon the occurrence of subscriber calls routed through congested ones of the serving switching centers.

In accordance with still another feature of the invention circuit apparatus enabled by generated timing pulses inhibits route relay operation of the common control equipment at switching centers and local central offices for intervals of time to prevent interconnection of incoming lines and trunk facilities with outgoing trunk facilities terminated in a congested switching center.

DESCRIPTION OF THE DRAWING

The foregoing features and advantages, as well as others, of the invention will be more apparent from a consideration of an illustrative embodiment now to be described with reference to the accompanying partially schematic drawing. Shown therein is a communication switching network, in accordance with the invention, in which a plurality of subscriber lines are selectively interconnected through a local central office with outgoing trunk facilities coupled to serving switching centers.

It will be noted that the drawing employs a type of notation referred to as "Detached Contact" in which an X, shown intersecting a conductor, represents a normally open "make" contact of a relay, and a "bar," shown intersecting a conductor at right angles, represents a normally closed "break" contact of a relay; "normally" referring to the unoperated condition of the relay. The principles of this type of notation are described in an article entitled "An Improved Detached-Contact-Type of Schematic Circuit Drawing" by F. T. Meyer in the Sept., 1955, publication of *American Institute of Electrical Engineers Transactions, Communication and Electronics*, Volume 74, pages 505–513.

GENERAL DESCRIPTION

Referring now to the drawing, it is intended that the apparatus emobdying the principles of the present invention be associated with a conventional telephone local central office of the type disclosed in U. S. Pat. No. 2,585,904 of Feb. 19, 1952, issued to A. J. Busch. The present invention is not limited to use with a telephone switching system of this type but may be advantageously utilized with other types of switching systems. It is further intended that for the present embodiment the aforementioned telephone local central office, hereinafter identified as local central offices 231 and 726, each serve a plurality of subscriber lines such as subscriber lines 1001 through 1005. It is also intended that local central offices 231 and 726 be connected by trunk facilities 2319, 23110, 9726, and 10726 with network switching toll centers 9 and 10 of the type set forth in U. S. Pat. No. 3,335,229, issued on Aug. 8, 1967 to P. J. Burke et al. For the sake of simplicity, the well-known particulars of the local central offices and toll centers have been omitted to simplify the drawing. Detailed operation of these types of switching systems may be obtained by referring to the aforementioned Busch and Burke patents.

Local central offices 231, 726 and toll centers 9, 10 are arranged to selectively interconnect trunk facilities 2319, 23110, 9726, 10726 with subscriber lines 1001 through 1005 for the purpose of establishing communication paths between calling and called subscribers. Basically, common control equipment, herein designated markers 1, 2, 122, operate route relays in accordance with subscriber dialed digits to select and initiate interconnection of outgoing trunk groups 100, 200, 103 with subscriber lines 1001 through 1004 and incoming trunk groups 101, 102.

A toll center of a communication switching network, such as toll center 10, is coupled to a plurality of local central offices and other network switching centers of the network. Incoming calls from these offices and centers, appearing as call attempts on incoming trunk group 102, compete with other call attempts appearing on incoming trunk group 101 for the services of the common control equipment of toll center 10. During heavy periods of traffic, represented by large numbers of call attempts appearing on incoming trunk groups 101, 102 of toll center 10, the common control equipment becomes overloaded and thereby causes a congested condition at toll center 10.

When a congested traffic condition exists at serving toll center 10, an overload signal is sent, via data link 260, to all local central offices and switching centers having trunk facilities terminated in incoming trunk groups of toll center 10. A call attempt originating on an incoming subscriber line of local central office 231 and routed over outgoing trunk group 200 through toll center 10 immediately following receipt of an overload signal, enables detecting and timing apparatus to open an operate path of marker route relays identifying outgoing trunk group 200 for a predetermined interval of time. Incoming call attempts thereafter generated by the subscriber lines of local central office 231 and attempting to route through congested toll center 10 are instead alternate routed by markers 1, 2 through toll center 9.

At the expiration of the time interval, the operate paths for marker route relays identifying outgoing trunk group 200 are again closed in order that a subsequent incoming subscriber call may be routed over outgoing trunk group 200 through toll center 10. Immediately following routing of the subsequent subscriber call the operate paths of marker route relays identifying outgoing trunk group 200 are again opened for a predetermined period of time in order that following subscriber calls intended for routing to toll center 10 may be alternate routed through toll center 9. As long as the overloaded condition exists at toll center 10, the interconnection of incoming subscriber lines and trunks of local central offices and other switching centers with outgoing trunks terminated in toll center 10, are dynamically time controlled to limit the rate at which call attempts are offered to overloaded toll center 10. This is accomplished by ensuring that the length of time between consecutive call attempts is always greater than a prescribed minimum number of seconds.

DETAILED DESCRIPTION

A subscriber, served by local central office 231 and desiring to establish a communication path between subscriber lines 1001 and 1005, places subscriber line 1001 in an off-hook state and thereby establishes a connection in the well-known manner through switching network 3 with register 4. Let us assume that upon receipt of dial tone, the calling subscriber dials the digits 726–1005, identifying the local central office and the subscriber line of the called subscriber, over subscriber line 1001 into register 4. After receipt of the dialed digits, register 4, in the well-known manner, seizes an idle marker, such as marker 2, and transfers the dialed digits thereto.

Marker 2 examines the first dialed digits 726 and grounds code point 2CP726 identifying the local central office serving called subscriber line 1005. Grounding of code point 2CP726 operates preferred route relay 2RR2 over an obvious operate path extending through normally released break contacts 2R2-1 and 2RR1-3. Operation of route relay 2RR2 directs marker 2 in a well known manner to select an idle trunk, such a trunk 21, in preferred outgoing trunk group 200. Subsequently local central office 231 transmits called number digits 726–1005 over connecting trunk facilities 23110 to toll center 10, and connects selected trunk 21 through switched network 3 with calling subscriber line 1001.

At toll center 10 the number digits 726–1005, received over trunk facilities 23110 and connecting trunk 21, are transmitted through sender link 120 to sender 121 and registered therein. In the well-known manner toll center 10 decodes the called number digits registered in sender 121 and obtains routing information that enables marker 122 to identify outgoing trunk group 103 coupled with local central office 726. Sender 121 in combination with marker 122 interconnects trunk 21 of incoming trunk group 101 through switched network 104 with outgoing trunk group 103 and transmits called number digits 1005 over outgoing trunk group 103 to local central office 726. Local central office 726, in the well-known manner, establishes a connection to called subscriber line 1005.

A large number of call attempts appearing as subscriber calls on incoming trunk groups 101, 102 of toll center 10 bids for the services of senders 121 through sender link 120. Since there are a limited number of senders 121 for toll center 10, a large number of call attempts overloads sender link 120 and, as set forth in the aforementioned patent by Burke et al. causes the operation of relay OS1 located in overload detector 132. Operation of relay OS1 closes make contacts OS1-1 and enables the transmission of an overload signal over data link 260 to local central offices and other switching centers served by toll center 10 as an indication that a traffic overload condition presently exists at toll center 10. The overload signal appearing at local central office 231 enables one input of AND gate 26.

If the calling subscriber of subscriber line 1001 initiates a call for subscriber line 1005 after an overload signal has been received from toll center 10, the grounding of marker 2 code point 2CP726 results in the operation of preferred route relay 2RR2. Route relay 2RR2 locks operated to the ground appearing at code point 2CP726 through make contacts 2RR2-1 and enables marker 2 to connect calling subscriber line 1001 through switched network 3 with an idle trunk of outgoing trunk group 200. The subscriber call then attempts completion through toll center 10 with called subscriber line 1005.

Digressing for a moment, the operation of marker 2 preferred route relay 2RR2 closes make contacts 2RR2-2 and thereby enables an input of OR gate 27. The resultant operation of OR gate 27 places an enabling signal on inputs of AND gates 25 and 26 that acts in combination with the overload signal appearing on data link 260 to operate AND gate 26. Operation of AND gate 26 enables monopulser T2. Monopulsers T1 and T2 are assumed to be any type of well-known monopulsers that operate in response to an input signal to generate an output signal for a specified interval of time. Thus, operation of AND gate 26 enables monopulser T2 to operate and hold operated for an interval of time, such as 10 seconds, relay D2. Relay D2 in operating closes make contacts D2-1 to place ground on the windings of relays 1R2 and 2R2 located in markers 1 and 2, respectively. These relays now operate to close make contacts 1R2-2, 2R2-2 and open break contacts 1R2-1, 2R2-1. The opening of break contacts 2R2-1 does not release preferred route relay 2RR2 of marker 2 which continues to be held operated by ground applied from code point 2CP726 through make contacts 2RR2-1.

The continued operation of preferred route relay 2RR2 enables marker 2 to complete its normal functions in connecting calling subscriber line 1001 with an idle trunk of outgoing trunk group 200. After marker 2 has completed its connecting functions, ground is removed from code point 2CP726, thereby releasing preferred route relay 2RR2 and opening previously operated make contacts 2RR2-1.

Assuming that a subscriber located at subscriber line 1004 desires to place a call to another subscriber served by local central office 726, register 4 transfers the dialed number digits to an idle marker, such as marker 1. Accordingly, code point 1CP726 is grounded for the purpose of enabling local central office 231 to establish a communication path with the called subscriber. Since make contacts 1R2-1 and 1RR2-1 are operated and released, respectively, preferred route relay 1RR2 does not operate. Instead, the ground on code point 1CP726 is applied through operated make contacts 1R2-2 and released break contacts 1R1-1, 1RR2-3 to operate alternate route relay 1RR1. Operation of alternate route relay 1RR1 enables marker 1 to identify outgoing trunk group 100 and to select an idle trunk 11 or 12 for connection to calling subscriber line 1004. The communication path for calling subscriber line 1004 is subsequently extended, via trunk facility 2319 through uncongested toll center 9 and over trunk facilities 9726 to local central office 726. Thus, during the timing interval of monopulser T2 all incoming calls appearing at local central office 231 and intended for routing through congested toll center 10 are instead alternate routed through another toll center, such as toll center 9.

After the timing interval, monopulser T2 releases relay D2 and thereby opens make contacts D2-1. The opening of these contacts removes ground from the windings of marker relays 1R2, 2R2 and allows them to release. Break contacts 1R2-1, 2R2-1 thereby release and establish a path from code points 1CP726, 2CP726 to preferred route relays 1RR2, 2RR2 of markers 1 and 2, respectively. A call attempt appearing this time at local central office 231 and intended for local central office 726 directs a marker, for example, marker 1, to ground code point 1CP726. The grounding of code point 1CP726 enables operation of preferred route relay 1RR2 which, in turn, locks operated to code point 1CP726 through make contacts 1RR2-1. Operation of preferred route relay 1RR2 enables marker 1 to route the calling subscriber line through switch network 3 over identified outgoing trunk group 200 to toll center 10. In addition, operation of preferred route relay 1RR2 closes make contacts 1RR2-2 to enable OR gate 27. Assuming that the overload condition still exists at toll center 10, enabling of OR gate 27 operates monopulser T2, via AND gate 26, to initiate another timing interval. In the aforementioned manner, the operation of relay D2, via make contacts D2-1, enables marker relays 1R2, 2R2 to open break contacts 1R2-1, 2R2-1 and close make contacts 1R2-2, 2R2-2. Subsequent call attempts grounding code points 1CP726, 2CP726 will operate alternate route relays 1RR1, 2RR1 in lieu of preferred route relays 1RR2, 2RR2 and thereby enables incoming subscriber calls to be routed over outgoing trunk group 100 through toll center 9.

In the event toll center 9 experiences a congested condition, an overload signal is transmitted over data link 259 to enable an input of AND gate 25 located in local central office 231. Assuming that call attempts for congested toll center 10 are presently being alternate routed through toll center 9, i.e., marker relays 1R2, 2R2 operated, the grounding of marker 2 code point 2CP726 operates alternate route relay 2RR1 over a path established through make contacts 2R2-2 in series with break contacts 2R1-1 and 2RR2-3. Alternate route relay 2RR1 locks operated through make contacts 2RR1-1, closes make contacts 2RR1-2 to enable OR gate 27, and directs marker 2 to route the incoming subscriber call over outgoing trunk group 100 to toll center 9. Enabling of OR gate 27, in combination with the overload signal appearing on data link 259, operates AND gate 25 to initiate operation of monopulser T1. Monopulser T1 enables relay D1 for a specified interval of time to close make contacts D1-1 and thereby operate marker relays 1R1, 2R1. Thus, when toll centers 9 and 10 are simultaneously experiencing overload conditions grounding of marker code point 2CP726, during the timing intervals of monopulsers T1 and T2, directs marker 2 through make contacts 2R2-2 and 2R1-2 to connect the calling subscriber line with a source of overflow tone.

When the overload condition subsides at toll center 10 the overload signal is removed from data link 260, thereby inhibiting operation of AND gate 26. After the inhibiting of AND gate 26 and the subsequent release of relay D2 all subsequent call attempts grounding marker code points 1CP726, 2CP726 operate preferred route relays 1RR2, 2RR2, respectivly, and are routed over identified outgoing trunk group 200 through toll center 10 to called local central office 726.

SUMMARY

It is obvious from the foregoing that the facility, economy, and efficiency of switching networks may be substantially enhanced by the provision of traffic management apparatus arranged to dynamically time limit the rate of traffic offered to overloaded switching systems comprising a switching network. It is further obvious from the foregoing that the present traffic management apparatus' unique feature of limiting the rate at which call attempts are offered to a congested switching system, by ensuring that the length of time between any two consecutive offered call attempts is always greater than a prescribed minimum interval of time, alleviates continuation of traffic overloads generated by switching systems provided with percentage cancellation apparatus.

While the traffic management control apparatus of the invention has been described in a local central office wherein interconnecting calling subscriber lines with trunks terminated in a congested switching center is time rate controlled, it is to be understood that such an embodiment is intended to be illustrative of the principles of the invention and that numerous other arrangments may be devised by those skilled in the art without departing from the spirit and scope of the invention.

For example, the present traffic management control apparatus could be provided in regional, sectional, primary, and toll switching centers to time rate control the interconnection of incoming trunk facilities with outgoing trunk facilities terminated in congested ones of other switching centers comprising a communication switching network.

What is claimed is:

1. A network traffic control arrangement for regulating traffic offered to network switching centers comprising means for selectively routing subscriber generated calls to ones of the switching centers;

means for ascertaining presence of call signals identifying subscriber generated calls intended for routing to a congested one of the switching centers; and means enabled by said ascertaining means for controlling said routing means to route ones of the subscriber generated calls to the congested switching center by ensuring that a minimum time between consecutive ones of the routed calls is greater than a prescribed time interval.

2. The network traffic control arrangement set forth in claim 1 wherein said ascertaining means comprises means responsive to overload signals generated by the congested switching center for detecting routing signals identifying the subscriber generated calls routed to the congested switching center.

3. The network traffic control arrangement set forth in claim 2 wherein said controlling means comprises means enabled by said detecting means for generating a timing pulse signal, and means enabled by said timing pulse signal for directing said routing means to route the subscriber generated calls identified by call signals occurring during an interval defined by said timing pulse to uncongested ones of the switching centers.

4. A network traffic control arrangement for regulating traffic offered to a congested switching center by interconnections of incoming communication facilities identified by call attempt signals with outgoing communication facilities terminated at the congested switching center comprising means responsive to the call attempt signals for selectively connecting the incoming communication facilities with the outgoing communication facilities, means for detecting connections of ones of the incoming communication facilities with ones of the outgoing communication facilities, and means responsive to said detecting means for limiting the call attempt signals offered to the congested switching center by inhibiting said connecting means from responding to ones of the call attempt signals occurring within a minimum time defined by a prescribed time interval following each of the detected connections.

5. A network traffic control arrangement for use with a switching center having common control equipment responsive to calling signals and arranged for offering the calling signals to network switching centers by interconnecting incoming communication facilities with outgoing communication facilities terminated at the network switching centers comprising means for receiving overload signals generated by a congested one of the network switching centers, means for detecting the common control equipment initiating interconnections of ones of the incoming communication facilities with ones of the outgoing communication facilities terminated at the congested network switching center, and means responsive to said receiving means and said detecting means for enabling the common control equipment to establish a minimum time between consecutive ones of the interconnections that is always greater than a prescribed time interval, thereby limiting the calling signals offered to the congested network switching center.

6. The traffic control arrangement set forth in claim 5 wherein said enabling means comprises logic means responsive to said receiving means and said detecting means for ascertaining occurrence of the interconnections concurrently with occurrences of the overload signals, timing means enabled by said logic means for generating a timing pulse signal, and means responsive to the timing pulse signal for inhibiting the common control equipment from responding to ones of the calling signals generated by the incoming communication facilities.

7. The traffic control arrangement set forth in claim 6 wherein said inhibiting means includes pulse operated relay apparatus individual to each one of a plurality of markers comprising the switching center common control equipment.

8. A network traffic control arrangement for use in controlling marker route relays of a local central office to regulate consecutive interconnections of subscriber lines identified by call attempt signals with outgoing trunks terminated in network switching centers comprising a slave relay;

a first path for operating one of the marker route relays in response to the call attempt signals and comprising break contacts of said slave relay in bridged combination with first make contacts of said one marker route relay;

a second path for receiving overload signals generated by a congested one of the switching centers;

a third path for generating connect signals signifying connections of ones of the subscriber lines with ones of the outgoing trunks terminated in the congested switching center and comprising second make contacts of said one marker route relay;

logic circuitry connected to said second and said third paths for detecting ones of said connecting signals generated during occurrences of said overload signals; and timing means enabled by said logic circuitry for enabling said slave relay to open said break contacts for a predetermined interval of time.

9. The network traffic control arrangement set forth in claim 8 further comprising a fourth path for operating an alternate one of the marker route relays in response to ones of said call attempt signals generated during said time interval and comprising make contacts of said slave relay in series with break contacts of said one marker route relay.

10. In a switching network, a local central office serving a plurality of subscriber lines and arranged for selectively connecting the subscriber lines with trunks extending to network switching centers, the local central office comprising traffic control means for controlling a rate of interconnecting calling ones of the subscriber lines with ones of the trunks terminated in a congested one of the network switching centers, and means enabled by the congested switching center in combination with connection signals generated by said traffic control means for enabling said traffic control means to establish a minimum time between consecutive ones of the interconnections that is always greater than a prescribed time interval.

* * * * *